(12) United States Patent
Fischer et al.

(10) Patent No.: US 7,530,598 B2
(45) Date of Patent: May 12, 2009

(54) GAS BAG MODULE

(75) Inventors: Anton Fischer, Leinweiler (DE); Juergen Heigl, Boebingen (DE); Steffen Rothweiler, Alfdorf (DE); Jochen Weiss, Essingen (DE)

(73) Assignee: TRW Automotive GmbH, Aldorf (DE)

( * ) Notice: Subject to any disclaimer, the term of this patent is extended or adjusted under 35 U.S.C. 154(b) by 0 days.

(21) Appl. No.: 11/435,111

(22) Filed: May 16, 2006

(65) Prior Publication Data

US 2006/0261582 A1 Nov. 23, 2006

(30) Foreign Application Priority Data

May 18, 2005 (DE) .............. 10 2005 022 760
Nov. 4, 2005 (DE) .............. 20 2005 017 267

(51) Int. Cl.
*B60R 21/26* (2006.01)
(52) U.S. Cl. ...................................... 280/742
(58) Field of Classification Search ............ 280/740, 280/741, 736, 737, 742
See application file for complete search history.

(56) References Cited

U.S. PATENT DOCUMENTS 5,217,249 A * 6/1993 Kokeguchi ............ 280/728.1
6,308,984 B1 10/2001 Fischer
6,322,102 B1 * 11/2001 Rau et al. ............ 280/736
6,802,532 B2 10/2004 Heigl et al.

FOREIGN PATENT DOCUMENTS

| DE | 4139405 | 6/1992 |
|---|---|---|
| DE | 10020796 | 12/2000 |
| DE | 10221659 | 8/2003 |
| DE | 10318133 | 10/2003 |
| DE | 202004016975 | 2/2005 |
| DE | 202005008847 | 11/2005 |
| EP | 0800960 | 10/1997 |

* cited by examiner

*Primary Examiner*—Faye M. Fleming
(74) *Attorney, Agent, or Firm*—Tarolli, Sundheim, Covell & Tummino LLP

(57) ABSTRACT

A gas bag module, in particular a side gas bag module, for a vehicle occupant protection system, has a gas bag, a gas generator, a housing of which has several outflow openings which are disposed such that the gas generator is in principle thrust-neutral. Further provided is a closure element which, in a standard case of release of the gas bag module, prevents gas from flowing out, at least in one direction, and in the case of fire is at least in sections thermally weakened or destroyed, such that the gas generator blows out gas thrust-neutrally.

20 Claims, 7 Drawing Sheets

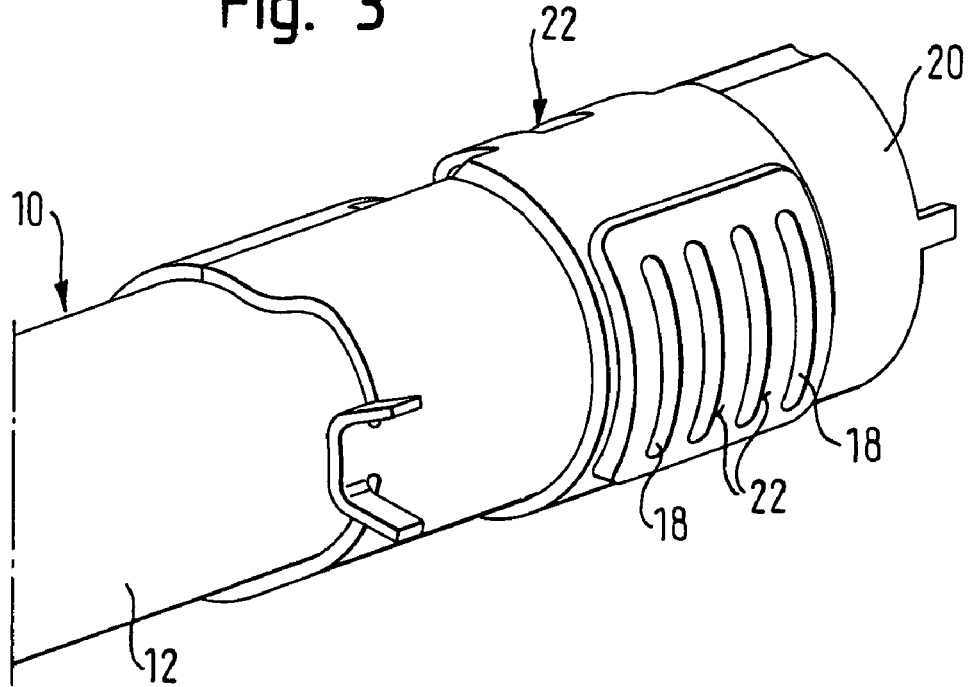
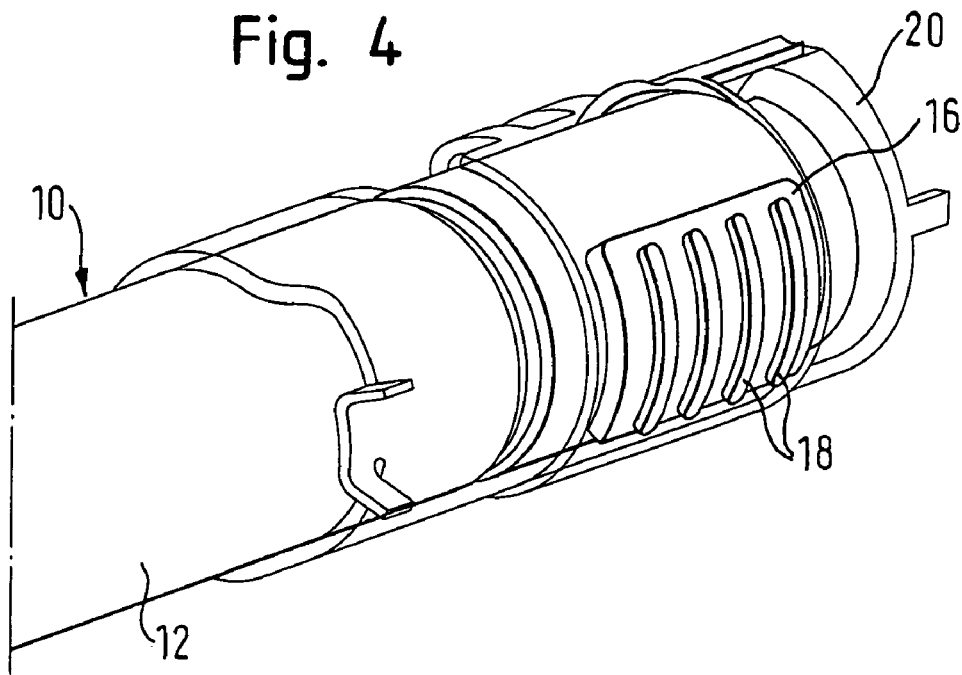

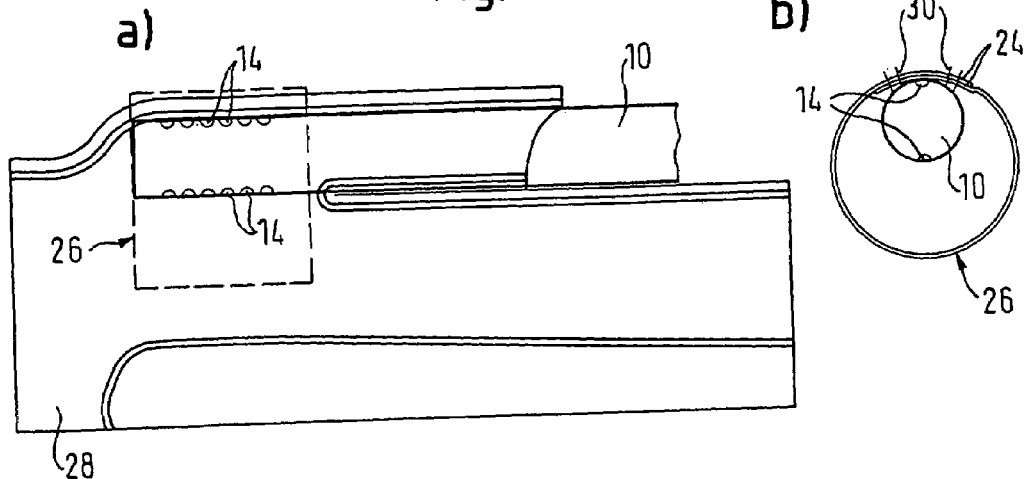
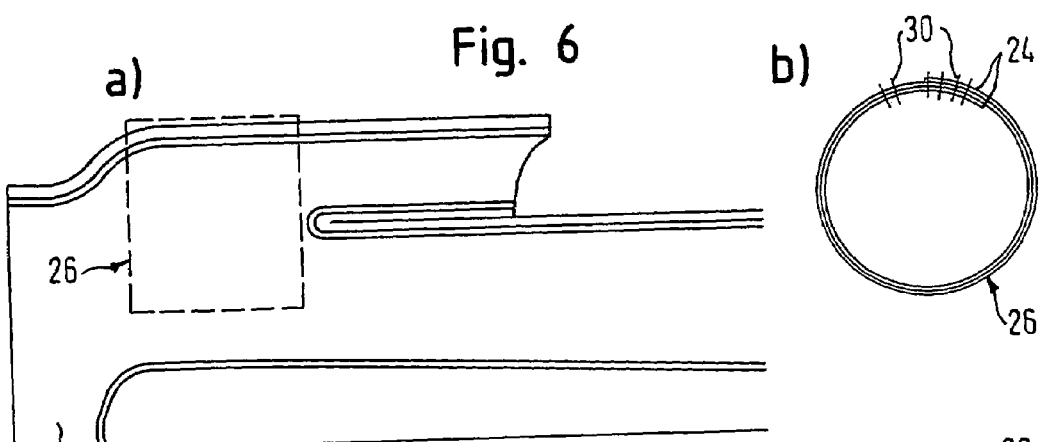
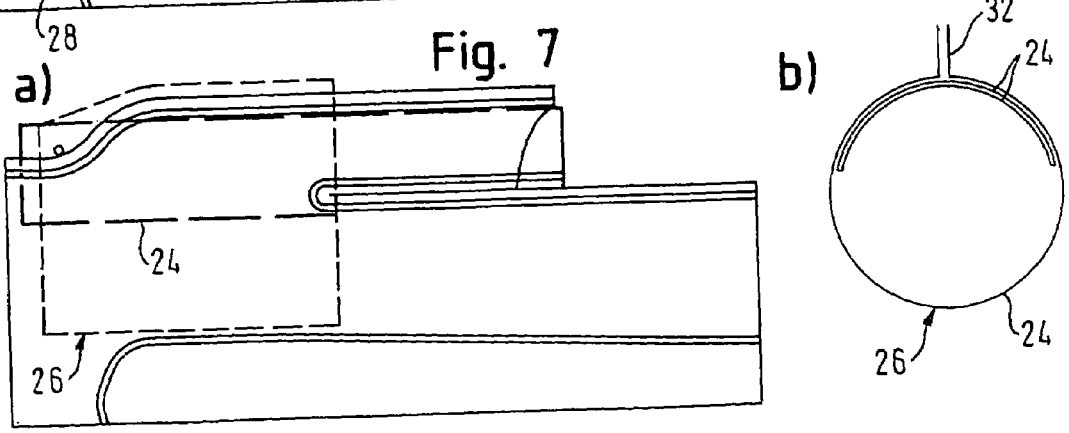

GAS BAG MODULE

TECHNICAL FIELD

The invention relates to a gas bag module, in particular a side gas bag module, for a vehicle occupant protection system.

BACKGROUND OF THE INVENTION

Nowadays, in the field of passenger cars, gas bags of a whole variety of types which are filled with compressed gas by a gas generator when there is a crash in order to protect a vehicle occupant, have become standard. So that no danger is posed by the gas generator in the case of a fire, either while conveying a gas bag module prior to fitting into a vehicle or in the fitted state of the gas bag module, gas generators are subjected to the so-called bonfire test of the German Federal Institute for Materials Testing with which the gas generator is subjected for a long time to an increased ambient temperature. The gas-producing material contained in the gas generator should ignite itself here, and burn down under controlled conditions. It must also be ensured, in particular so as to guarantee safety during conveyance, that in the case of a fire, the gas bag module behaves thrust-neutrally, i.e. that when the gas generator is burning down, no thrust is produced.

The invention provides a gas bag module which, in a normal case of release, provides for rapid and reliable filling of a gas bag, and which in the case of a fire, is characterized by thrust-neutrality, even in a fully pre-assembled or a fitted state.

BRIEF SUMMARY OF THE INVENTION

According to the invention, a gas bag module comprises a gas bag and a gas generator, a housing of which has several outflow openings which are disposed such that the gas generator is in principle thrust-neutral. Moreover, the gas bag module has a closure element which, in a standard case of release of the gas bag module, prevents gas from flowing out, at least in one direction, and in a case of fire is, at least in sections, one of thermally weakened and destroyed such that the gas generator blows out gas thrust-neutrally. In this way, provision is made such that in a standard case of release, the gas bag is filled rapidly with gas, and in a case of fire, the gas bag module behaves thrust-neutrally. Unlike gas bag modules known from the prior art, with which a gas generator, which is in principle thrust-neutral, is attached in a module housing such that part of the outflow openings are permanently covered (for example by a temperature-resistant steel bracket or similar), the solution according to the invention offers the advantage that the gas bag module maintains its thrust-neutrality in the case of a fire, also in pre-assembled, and even in fitted state. It is thus also possible for example to convey the already fully pre-assembled gas bag module, by means of which costs can be saved with respect to the prior art. The closure element in particular is a separate component, so not for example a section of a module housing or similar, by means of which fragmentation of the module housing is prevented in the case of a fire, and so the stability of the module is improved.

Preferably, in the region of the outflow openings, the closure element is in direct contact with the housing of the gas generator. Alternatively, it is also conceivable for the closure element to be fitted to a module housing or a diffuser device.

The closure element can be made of synthetic, the destruction or weakening of which, in the case of a fire, for example by melting or softening, is non-critical.

The outflow of gas in a certain direction can be prevented particularly effectively in a standard case of release in that the closure element closes part of the outflow openings, so as to be largely gas-tight.

The closure element can for example be a covering plate with at least one integrally formed appendage, i.e. designed like a plug.

The covering plate here preferably has a material of greater thermal stability than the appendage. The materials should be co-ordinated such that in the case of a fire, only the appendage is weakened or destroyed, whereas the covering plate itself remains intact.

The appendage can engage in an outflow opening of the housing, and the closure element as a whole therefore represents a type of sealing plug.

According to a further embodiment, the gas generator, at least in sections, is surrounded by a bracket which, in the region of the outflow openings of the housing also has openings. Advantageously, the closure element is then disposed between the gas generator and the bracket; the bracket therefore also serves as a holder for the closure element.

The appendage can engage here in an opening of the bracket. Additionally or alternatively, an appendage can also engage in an outflow opening of the gas generator housing.

According to an alternative embodiment of the invention, the closure element comprises at least one fabric layer. This can be sewn directly into the gas bag or been provided separately, and is a non-critical material in the case of a fire, compared for example with a metal.

The fabric layer can be part of a fabric tube surrounding the gas generator. In a standard case of release, the fabric tube covers part of the outflow openings, and uncovers them in the case of a fire by melting or burning of the fabric.

In the region of the outflow openings at least, the fabric tube should not have any seams. In this way, in the case of a release, in which hot gas passes through the outflow openings, a higher stability of the fabric tube is achieved.

Preferably, the fabric tube is multi-layered, at least in the region of the closure element. The fabric layers must be designed such that in a standard case of release of the gas bag module, they withstand the pressure and the temperature of the gas produced, but in the case of a fire, are destroyed due to the considerably higher temperature and/or the higher gas pressure.

In particular, the fabric tube can rest against the gas generator in the region of the closure element and have a significantly greater diameter than the gas generator. The fabric tube thus covers the outflow openings of the gas generator disposed in the region of the closure element, whereas other outflow openings, for example those lying opposite these, are open. Due to its greater diameter, the fabric tube is at the same time a gas deflection device in that gas from the uncovered outflow openings moves, at a distance, onto the fabric tube, and is deflected by the same.

Particularly advantageously, the fabric tube is totally without seams. In this way, in a standard case of release, particularly high stability and reliable covering of part of the outflow openings is achieved.

The gas generator can be surrounded by two fabric tubes of different diameter. These preferably rest directly against one another in the region of the closure element, whereas in a region in which it is possible for gas to flow out in the standard case of release, the fabric tube with the larger diameter is disposed at a distance from the other fabric tube and serves as a gas deflection device.

According to a further embodiment of the invention, in the region of the outflow openings, the gas generator is surrounded by a tubular housing, a first axial end of which is open, and a second axial end of which is closed at least partially by the closure element. In a standard case of release, the gas mainly flows axially through the first open end of the tubular housing into the gas bag. In the case of a fire, the second axial end is partially uncovered by weakening or destruction of the closure element, and in this way, thrust-neutrality is achieved in the axial direction.

The closure element can be a sleeve disposed between the gas generator and the tubular housing, and which once again is preferably made of synthetic.

The tubular housing preferably has at least one radial opening which is at least partially closed by the closure element. In a standard case of release, this radial opening also serves to fill the gas bag, and is fully uncovered when the closure element is destroyed. In particular, two radial openings lying opposite one another are provided, one of which is fully closed by the closure element so that in the case of a fire, thrust neutrality is also provided in the radial direction of the gas generator.

BRIEF DESCRIPTION OF THE DRAWINGS

FIG. 3 shows a perspective view of a gas generator with a closure element and bracket which are alternatively used with the gas bag module according to the invention;

FIG. 4 shows a perspective view of the gas generator from FIG. 3, partially transparent;

FIGS. 5a and 5b show a longitudinal and a cross-sectional view of a gas bag module according to a second embodiment of the invention;

FIGS. 6a and 6b show a longitudinal and a cross-sectional view of a gas bag module similar to that from FIG. 5, in slightly modified form;

FIGS. 7a and 7b show a longitudinal and a cross-sectional view of a gas bag module similar to FIG. 5, in a further modified form;

DETAILED DESCRIPTION OF THE PREFERRED EMBODIMENTS

Figure 1:
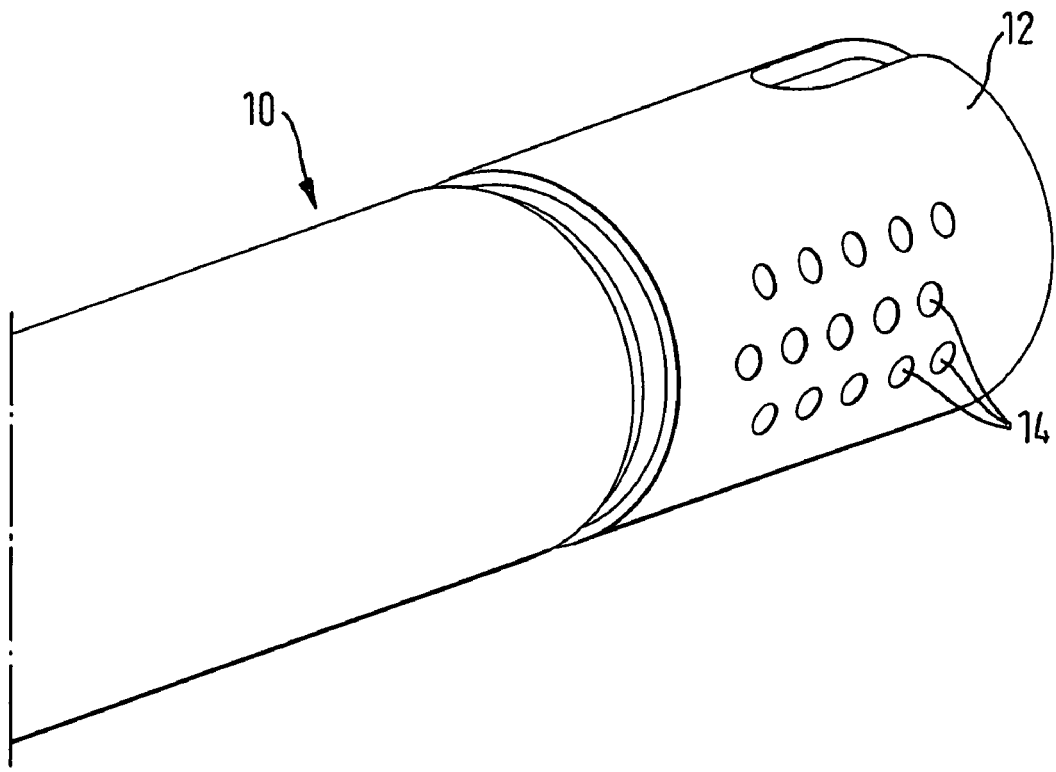
FIG. 1 shows a perspective view of a gas generator, as used with a gas bag module according to a first embodiment of the invention.

FIG. 1 shows an oblong tubular gas generator 10, as used with a side gas bag module according to a first embodiment of the invention. Of course the gas generator 10 could also be used in any other gas bag module, e.g. in a front passenger gas bag module. The gas generator 10 has a housing 12 with several outflow openings 14 which are disposed such that the gas generator 10 is thrust-neutral in non-fitted state, as shown in FIG. 1. In the case of the gas generator 10, this means specifically that on the opposite side of the gas generator 10, not visible in the Figure, outflow openings are also disposed which substantially correspond to the outflow openings 14.

Figure 2:
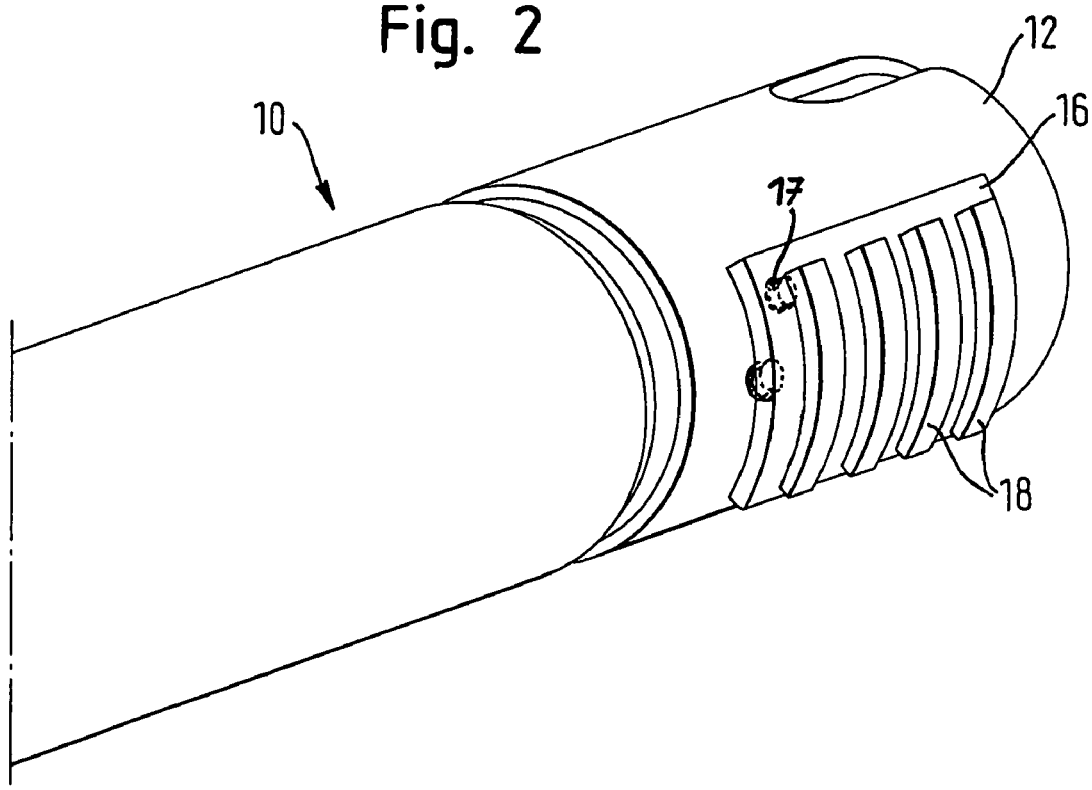
FIG. 2 shows a perspective view of the gas generator from FIG. 1 with a fitted closure element.

In FIG. 2, the gas generator 10 is shown with a closure element in the form of a covering plate 16 which, on the inner side facing the gas generator 10, has one or more integrally formed appendages 17 and several cross-pieces 18 integrally formed on its outer side for reinforcement. The appendage/s 17 engage/s like a plug in one or more of the outflow openings 14. In this way, part of the outflow openings 14, namely the outflow openings 14 visible in FIG. 1, are closed so as to be gas-tight by the covering plate 16 and the appendages 17. In a standard case of release of the gas bag module, gas is thus prevented from flowing out through the outflow openings 14 visible in FIG. 1, whereas the outflow openings not visible in the Figure, which lie directly opposite the outflow openings 14, are open and provide for the filling of a gas bag, also not shown in the Figure.

In the case of a fire, the appendages 17, which, like the covering plate 16, are also made of synthetic, but of a synthetic which is less thermally stable, are destroyed or at least weakened by melting and/or burning such that the covering plate 16 as a whole is released from the housing 12 and so uncovers the outflow openings 14. Fragmentation of the covering plate 16 is thus largely prevented.

The covering plate 16 can be clipped on as a separate component into the housing 12, as shown in the Figures, or alternatively directly injection-molded onto the housing 12. It is also possible to dispose the covering plate 16 inside the housing 12.

FIGS. 3 and 4 show an alternative embodiment to FIGS. 1 and 2. Here, the same, or functionally the same components carry the same reference numbers.

The arrangement according to FIGS. 3 and 4 only differs from that previously described in that an additional bracket 20 is provided which surrounds the gas generator 10 in sections. The bracket 20 serves to attach the gas generator 10 in the vehicle, and in the region of the outflow openings 14 facing the observer (see FIGS. 1 and 2) as well as in the region of the outflow openings lying opposite these, has one or more openings 22. The closure element, once again designed as a covering plate 16, is disposed between the gas generator 10 and the bracket 20. Here, the cross-pieces 18 molded onto the covering plate 16, which are also appendages, engage into the slit-shaped openings 22 of the bracket, by means of which the covering plate 16 is fixed over the outflow openings 14 and closes them so as to be largely gas-tight.

Additionally or alternatively, the covering plate 16 can have cylindrical appendages corresponding to the outflow openings 14 on its side facing the gas generator 10 which engage in the outflow openings 14. With respect to the variation without a bracket, this offers the advantage of additional radial fixing of the covering plate 16 in a standard case of release. In the case of a fire, the appendages or cross-pieces 18 are once again thermally destroyed, by means of which the covering plate 16 as a whole can slide from the outflow openings 14 and uncover these so as to obtain thrust neutrality.

FIGS. 5a and 5b show a gas bag module according to an alternative embodiment with which the closure element is formed by several fabric layers 24 which are part of a fabric tube 26 surrounding the gas generator 10. The fabric tube 26 is disposed inside a gas bag 28, part of which is shown in FIG. 5a in an unfolded state. The fabric tube 26 has a diameter approximately twice as large as that of the gas generator 10, because of which, in a standard case of release, the outflow openings 14 which lie at the bottom in FIGS. 5a and 5b are uncovered. The gas passing through these outflow openings first of all flows onto the fabric tube 26 and is deflected and distributed by it.

In a normal case of release, the upper outflow openings 14 in FIG. 5 are covered by several fabric layers 24 of the fabric tube 26, and in this way are closed, so as to be largely gas-tight. In the case of a fire, these fabric layers 24 melt or burn, and uncover the outflow openings 14. As is made clear in particular from the cross-sectional view (FIG. 5b), there are no seams 30 of the fabric tube 26 directly at the outflow openings 14, by means of which a particularly stable embodiment is achieved.

The fabric tube 26 according to FIG. 5 has two fabric layers 24 over a large part of its periphery; in the region of the upper outflow openings 14, there are a total of three fabric layers 24 which overlap one another.

FIG. 6 shows a gas bag module which is very similar to that of FIG. 5, with the exception that the seams 30 are disposed slightly differently, and the fabric tube 26 has three fabric layers 24 over a large part of its periphery, and in the region of the upper outflow openings 14 even has four fabric layers 24. Both fabric tubes 26 (FIGS. 5 and 6) are formed by rolling and then sewing a single, substantially rectangular piece of fabric.

FIG. 7 shows a further gas bag module which is very similar to that of FIGS. 5 and 6. The fabric tube 26 according to FIG. 7 only has one continuous fabric layer 24 which is sewn to the gas bag fabric in an upper region 32. For reinforcement, two further fabric layers 24 are disposed in the upper half (see FIG. 7b) which only just extend over half of the periphery of the fabric tube 26.

Figure 8:
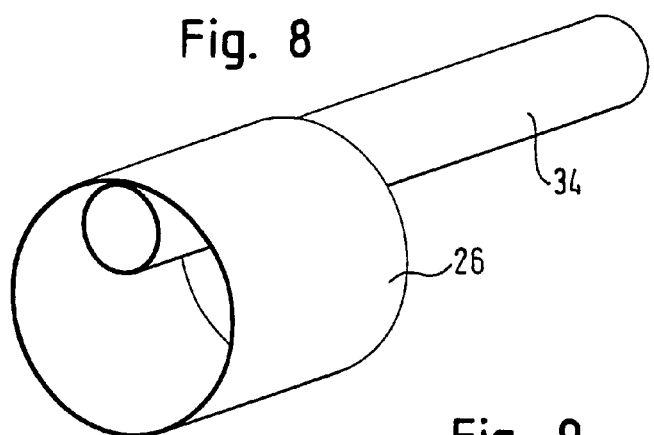
FIG. 8 shows a perspective view of a closure element which is alternatively used with the gas bag module from FIG. 5.
Figure 9:
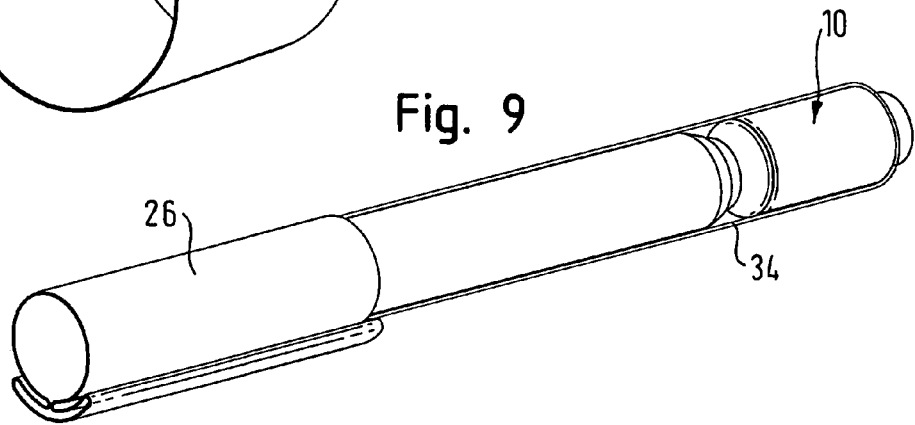
FIG. 9 shows a perspective view of a gas generator with the closure element from FIG. 8.
Figure 10:
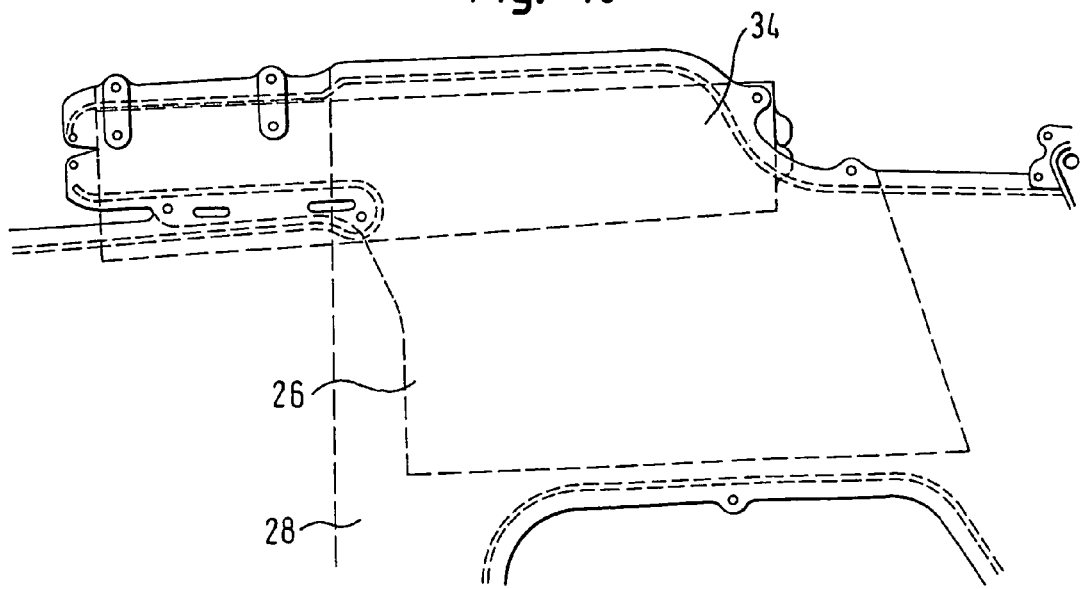
FIG. 10 shows a longitudinal sectional view through a gas bag module with the closure element according to FIGS. 8 and 9.

FIGS. 8 to 10 show a further variation of a closure element made of a fabric. In this embodiment, the closure element is formed by two seamless fabric tubes 26 and 34 which have different diameters. When fitting the gas bag module, the inner fabric tube 34 with the smaller diameter (this corresponds approximately to the diameter of the gas generator 10) is fixed to the outer fabric tube 26 with the larger diameter (see FIG. 8). The gas generator 10 is then pushed into the inner fabric tube 34. The outer fabric tube 26, which is made of a high-strength fabric, is folded, as shown in FIG. 9, and secured by means of a film or fixing tapes. This unit shown in FIG. 9 is then pushed into the gas bag 28 without any fabric projecting (see FIG. 10).

In a standard case of release, both the inner fabric tube 34 serving as reinforcement and the outer fabric tube 26 close the upper outflow openings 14. The lower outflow openings 14 are only closed by the inner fabric tube 34 which melts due to the outflowing hot gas. Alternatively, the fabric tube 34 can already have an opening in this region. The gas coming out through the lower outflow openings 14 flows onto the folded fabric tube 26 (see FIG. 9) which thereupon widens downwardly, as shown in FIG. 10, and deflects the gas. Tensile forces thus created in the fabric tube 26 are transferred to the upper side of the gas generator 10 due to the lack of seams. The fabric tube 26 also serves to protect the gas bag 28.

In the case of a fire, both fabric tubes 26, 34 are thermally destroyed, at least in the region of the upper outflow openings 14.

Figure 11:
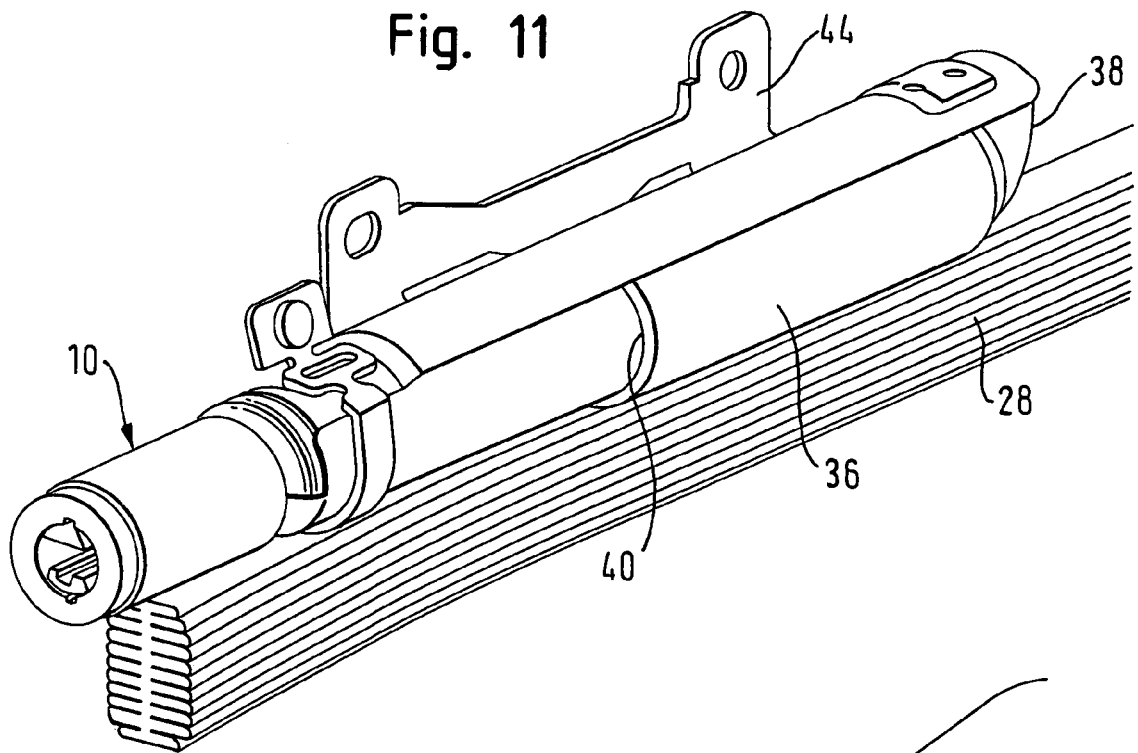
FIG. 11 shows a perspective view of a gas bag module according to a third embodiment of the invention.
Figure 12:
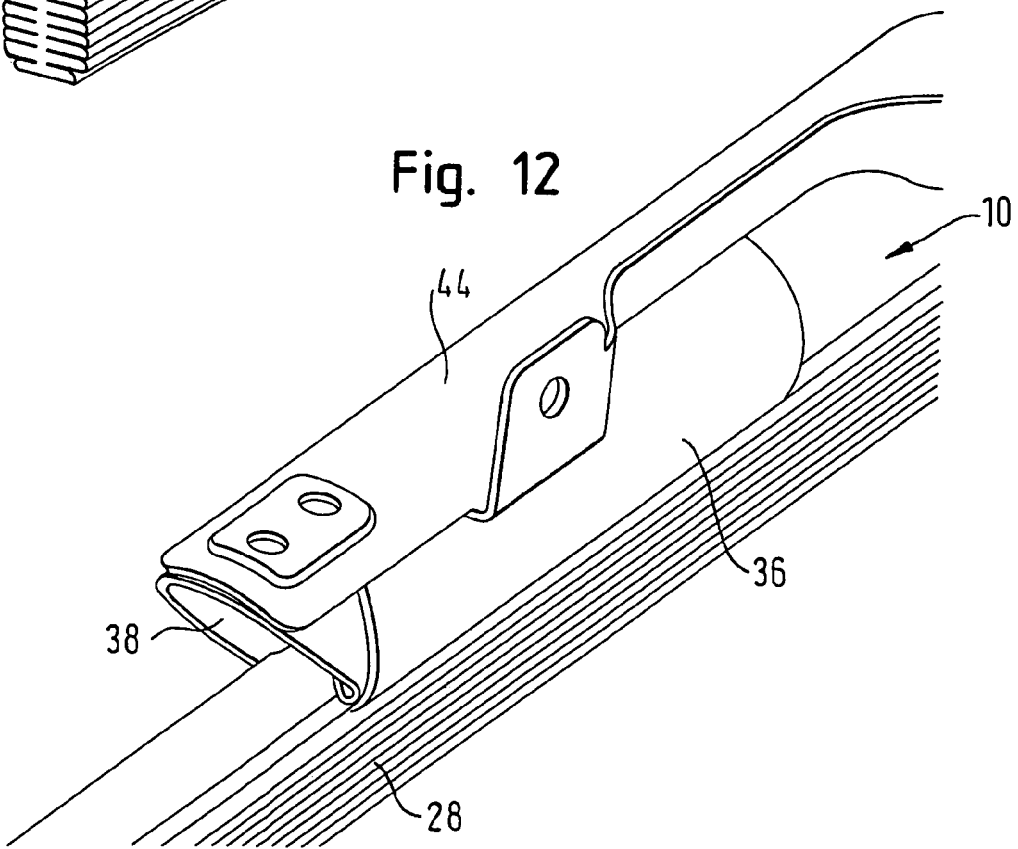
FIG. 12 shows a detail view of the gas bag module from FIG. 11.
Figure 13:
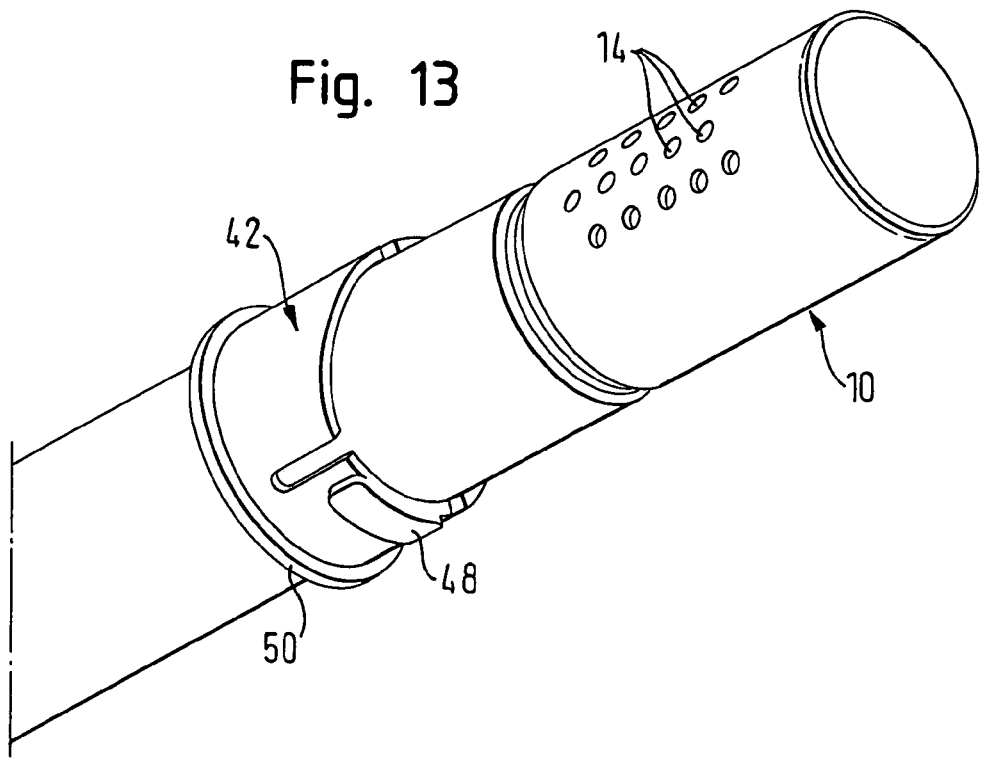
FIG. 13 shows a perspective view of a gas generator with a closure element, as used with the gas bag module from FIG. 11.

FIGS. 11 and 12 show a gas bag module according to a further embodiment of the invention, in which the gas generator 10, which corresponds to that of FIG. 1, is surrounded by a tubular housing 36. The tubular housing 36 has an open first axial end 38 extending at an angle with respect to the central axis of the tubular housing 36, and a second axial end 40 which is closed, partially by the gas generator 10 itself, partially by a closure element in the form of a sleeve 42 (see FIGS. 13 and 14). For the purpose of attaching in a vehicle, a rail 44 is furthermore provided which is connected to the gas generator 10 or to the tubular housing 36. The sleeve 42 is made of synthetic, and as can be seen in FIGS. 13 and 14, disposed between the gas generator 10 and the tubular housing 36.

Figure 14:
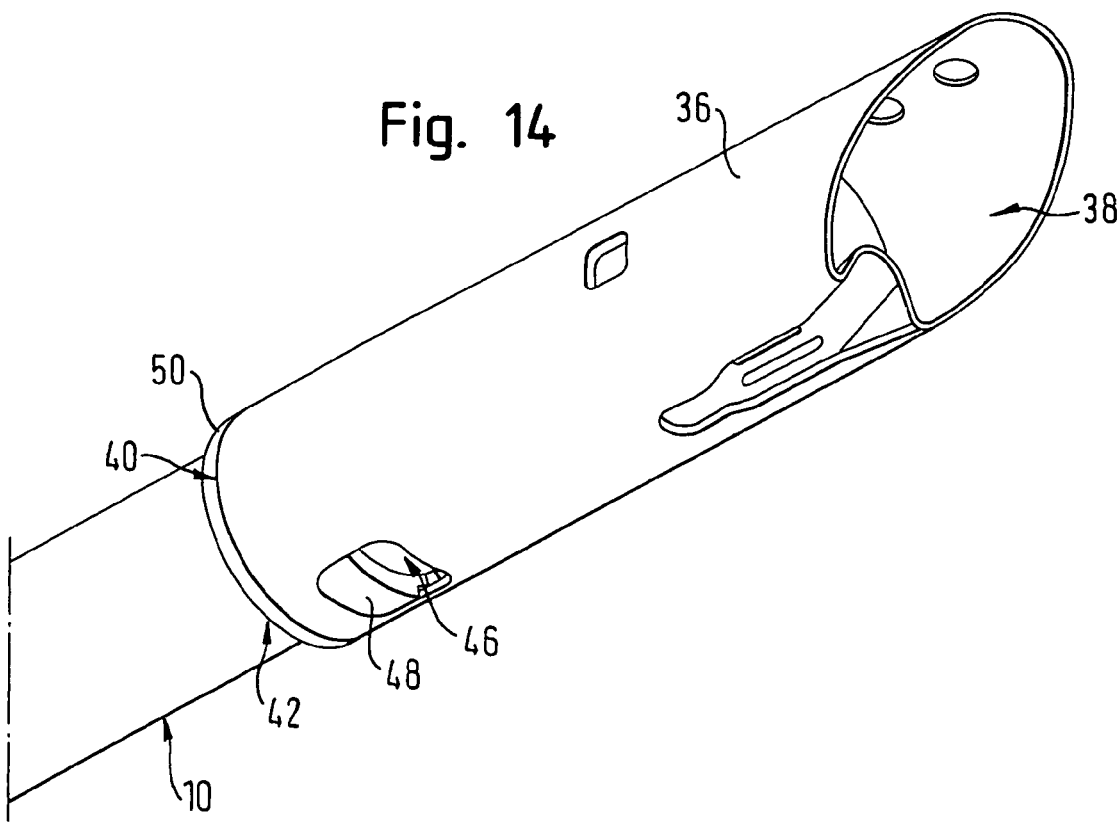
FIG. 14 shows a perspective view of the gas generator from FIG. 13, but with a tubular housing.
Figure 16:
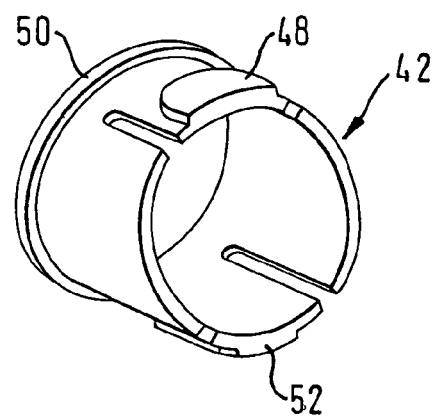
FIG. 16 shows a perspective view of the closure element from FIG. 13.

The tubular housing 36 also has two radial openings 46, lying opposite one another, of which only the lower one can be seen in FIG. 14. This lower radial opening 46 is partially closed by an appendage 48 formed integrally with the sleeve 42. A peripheral edge 50 also integrally formed with the sleeve provides a reliable seal in the axial direction. The second radial opening, not visible in the Figures, is fully closed by an appendage 52 also formed integrally with the sleeve 42 (see FIG. 16).

In the standard case of release, gas which collects in the narrow annular space between the tubular housing 36 and the gas generator 10, can leave the tubular housing 36 both via the open first end 38 and via the lower radial opening 46, and flow into the gas bag 28. In the case of fire, the sleeve 42 melts or burns, or is at least weakened to such an extent that it fully uncovers both the second axial end 40 and the two radial openings (see FIG. 15). In this way, thrust neutrality of the gas generator 10 is achieved, both in the axial and in the radial direction.

Figure 15:
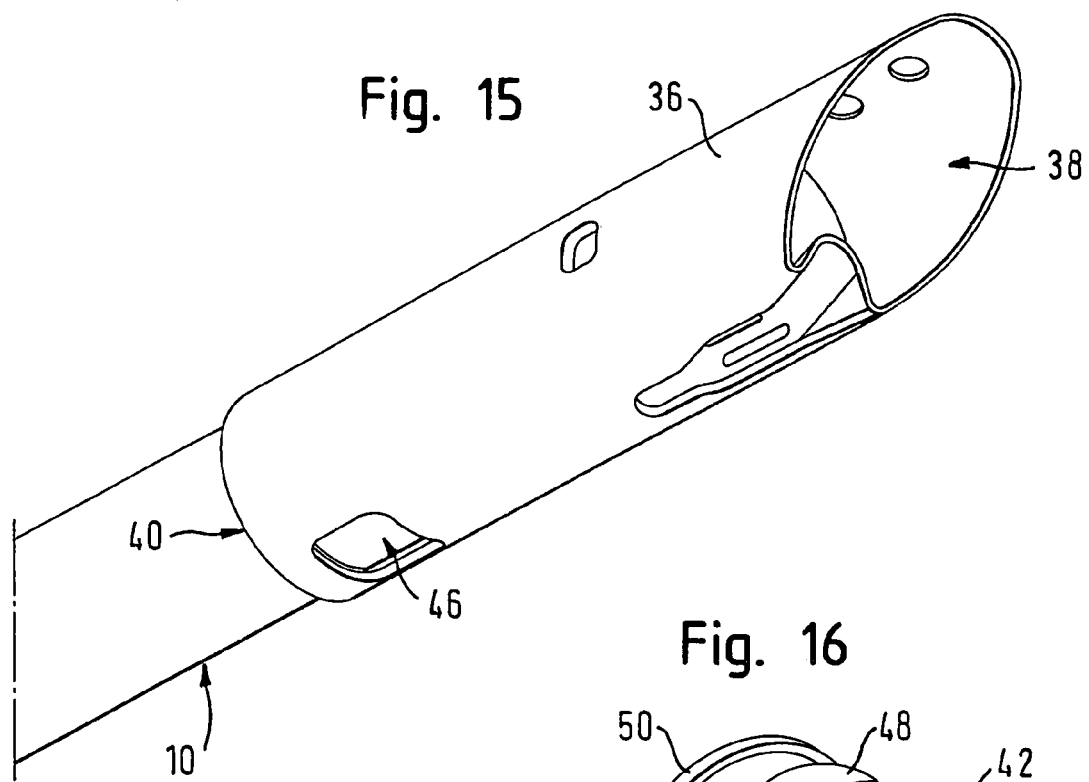
FIG. 15 shows a perspective view of the gas generator with the tubular housing from FIG. 14, after destruction of the closure element.
Figure 17:
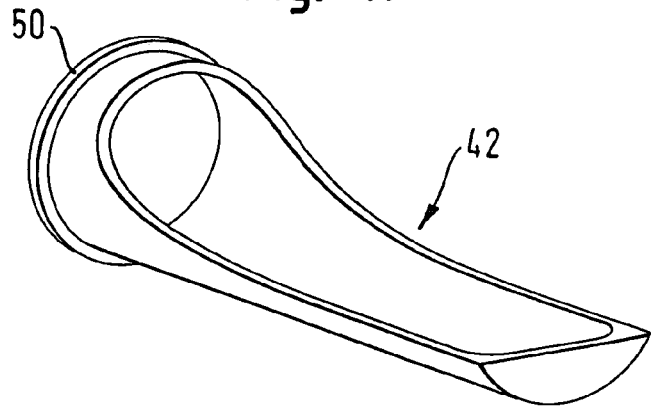
FIG. 17 shows a perspective view of an alternative closure element.

FIG. 17 shows an alternative embodiment of the sleeve 42 which in this view (as also in FIG. 16) is shown rotated through 180° as compared to FIGS. 11 to 15. With the sleeve 42 according to FIG. 17, the lower radial opening 46 in FIG. 15 is fully open in the standard case of release, whereas the upper radial opening lying opposite is completely covered.

The invention claimed is:

1. A gas bag module for a vehicle occupant protection system, comprising a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and thermally destroyed, such that the gas generator (10) blows out gas thrust-neutrally, wherein in the region of the outflow openings (14), the closure element is in direct contact with the housing (12) of the gas generator (10).

2. The gas bag module according to claim 1, wherein the closure element is made of synthetic.

3. The gas bag module according to claim 1, wherein the closure element closes part of the outflow openings (14) so as to be largely gas-tight.

4. A gas bag module for a vehicle occupant protection system, comprising:

a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and thermally destroyed, such that the gas generator (10) blows out gas thrust-neutrally, wherein the closure element is a covering plate (16) with at least one integrally formed appendage (17, 18) engaging in at least one outflow opening.

5. The gas bag module according to claim 4, wherein the covering plate (16) has a material of greater thermal stability than the appendage (17, 18).

6. The gas bag module according to claim 4, wherein the appendage (17) engages in an outflow opening (14) of the housing (12).

7. A gas bag module for a vehicle occupant protection system, comprising:

a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and destroyed, such that the gas generator (10) blows out gas thrust-neutrally, wherein the gas generator (10), at least in sections, is surrounded by a bracket (20) which in the region of the outflow openings (14) of the housing (12) also has openings (22).

8. The gas bag module according to claim 7, wherein the closure element is disposed between the gas generator (10) and the bracket (20).

9. The gas bag module according to claim 7, wherein the closure element is a covering plate (16) with at least one integrally formed appendage (18) which engages in an opening (22) of the bracket (20).

10. A gas bag module for a vehicle occupant protection system, comprising:

a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and thermally destroyed, such that the gas generator (10) blows out gas thrust-neutrally, wherein the closure element comprises at least one fabric layer (24).

11. A gas bag module for a vehicle occupant protection system, comprising a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and destroyed, such that the gas generator (10) blows out gas thrust-neutrally, said closure element comprising at least one fabric layer (24), wherein the fabric layer (24) is part of a fabric tube (26, 34) surrounding the gas generator (10).

12. The gas bag module according to claim 11, wherein at least in the region of the outflow openings (14) the fabric tube (26, 34) does not have any seams (30).

13. The gas bag module according to claim 11, wherein the fabric tube (26, 34) is multi-layered, at least in the region of the closure element.

14. The gas bag module according to claim 11, wherein the fabric tube (26, 34) rests against the gas generator (10) in the region of the closure element and has a significantly greater diameter than the gas generator.

15. The gas bag module according to claim 11, wherein the fabric tube (26, 34) is totally without seams.

16. The gas bag module according to claim 11, wherein the gas generator (10) is surrounded by two fabric tubes (26, 34) of different diameter.

17. A gas bag module for a vehicle occupant protection system, comprising a gas bag (28), a gas generator (10), a housing (12) of which has several outflow openings (14) which are disposed such that the gas generator (10) is in principle thrust-neutral, and a closure element which, in a standard case of release of the gas bag module, prevents gas from flowing out, at least in one direction, and in a case of fire is at least in sections one of thermally weakened and destroyed, such that the gas generator (10) blows out gas thrust-neutrally, wherein in the region of the outflow openings (14), the gas generator (10) is surrounded by a tubular housing (36), a first axial end (38) of which is open, and a second axial end (40) of which is closed at least partially by the closure element.

18. The gas bag module according to claim 17, wherein the closure element is a sleeve (42) disposed between the gas generator (10) and the tubular housing (36).

19. The gas bag module according to claim 17, wherein the tubular housing (36) has at least one radial opening (46) which is at least partially closed by the closure element.

20. The gas bag module of claim 1, wherein the closure element closes the outflow openings of the housing of the gas generator.

* * * * *